United States Patent [19]

Fuller et al.

[11] E Patent Number: Re. 32,226

[45] Reissued Date of Patent: Aug. 12, 1986

[54] ELECTRONIC FRANKING MACHINES

[75] Inventors: Paul Fuller, Romford; John B. Gillender, Canvey Island; Michael Shacklady, Benfleet; Samir Basu, Romford, all of England

[73] Assignee: Roneo Alcatel Limited, Esses, England

[21] Appl. No.: 650,242

[22] Filed: Sep. 13, 1984

Related U.S. Patent Documents

Reissue of:

[64] Patent No.: 4,093,999
Issued: Jun. 6, 1978
Appl. No.: 746,490
Filed: Dec. 1, 1976

[51] Int. Cl.[4] ..... G06F 3/12; G06F 3/02; G06F 15/21; H03K 21/00

[52] U.S. Cl. ..... 364/900; 377/38

[58] Field of Search ..... 377/38; 235/101; 364/466, 200, 900, 200 MS File, 900 MS File; 177/5, 25

[56] References Cited

U.S. PATENT DOCUMENTS

| | | | |
|---|---|---|---|
| Re. 31,875 | 4/1985 | Check, Jr. et al. | 364/900 |
| 3,551,652 | 2/1970 | Faude | 377/38 X |
| 3,635,297 | 1/1972 | Salava | 177/5 |
| 3,692,988 | 9/1972 | Dlugos et al. | 364/466 |
| 3,872,282 | 3/1975 | Long | 377/38 |
| 3,938,095 | 2/1976 | Check, Jr. et al. | 364/900 |
| 3,951,221 | 4/1976 | Rock | 177/25 |
| 3,978,457 | 8/1976 | Check, Jr. | 364/200 |
| 4,001,568 | 1/1977 | Iizuka | 364/900 |
| 4,143,417 | 3/1979 | Wald et al. | 364/900 |

*Primary Examiner*—Harvey E. Springborn
*Attorney, Agent, or Firm*—Larson and Taylor

[57] ABSTRACT

[An electronic franking machine, for example a postal franking machine, has a digital electronic input register, for storing a selected franking value fed in for use in the next franking operation of the machine, and a digital electronic total register which accumulates an indication of the total of the respective franking values used for such operations of the machine since this register was last reset. The machine also has an electrically adjustable printing device, for printing the selected franking value in each franking operation. The printing device is housed in a relatively massive stationary unit of the machine, and the electronic registers and associated circuitry are housed in a relatively light portable unit that is readily separable from the stationary unit to facilitate resetting by a remote authority.]

*A franking machine, for example a postal franking machine, has a digital electronic input register, for storing a selected franking value fed in for use in the next franking operation of the machine, and a digital electronic total register which accumulates an indication of the total of the respective franking values used for such operations of the machine since this register was last reset. The machine also has an electrically adjustable printing device, for printing the selected franking value in each franking operation, which device may be housed in a relatively massive stationary unit of the machine, the electronic registers and associated circuitry being housed in a relatively light portable unit that is received in nested relation in and, readily separable from, the stationary unit to facilitate resetting by a remote authority.*

28 Claims, 15 Drawing Figures

* ANY ONE OF THE FOLLOWING ITEMS ARE DISPLAYABLE VIA KEY BOARD F.C.C., S.C.C., L.C. T.C., C.R. AND T.R.

ELECTRONIC FRANKING MACHINES

Matter enclosed in heavy brackets [ ] appears in the original patent but forms no part of this reissue specification; matter printed in italics indicates the additions made by reissue.

The present invention relates to electronic franking machines.

In the field of postal franking, previously-used machines have employed mechanical or electro-mechanical systems for selection of digits representing values to be franked (on an envelope, for example), for metering individual franking operations (recording and collating amounts franked, for example) and for storage of information concerning, for example, total value franked to date. Setting of a value to be franked is carried out mechanically by selecting an angular position for a numbered wheel, which position is retained once set, Such a mechanical machine is described, for example, in U.S. Pat. No. 3,451,519. Incidentally, an electrically adjustable printing device is disclosed in U.S. Pat. No. 3,869,986, but even this does not suggest any departure from the conventional use of cumbersome electromechanical meter memories.

Although such previously used systems are well proven, it is desirable to provide franking-value selection and registration means such as can enable a reduction in size and weight to be achieved, without significant loss of efficiency and reliability as compared with prior franking machines.

According to the present invention there is provided a franking machine, comprising:

franking value selection means, operable selectively to provide an electrical input representative of a franking value selected for a desired next franking operation of the machine, for setting the selected franking value into the machine;

a digital electronic input register, having an input connected to said franking value selection means, for receiving and holding said selected franking value;

an electrically adjustable printing device, settable electrically to any selected one of a plurality of different conditions enabling the device to be actuated respectively to print a plurality of different franking values;

setting control circuitry, connected with said input register and said printing device, operable in dependence upon said electrical input to bring about setting of said printing device to the condition in which it is actuable to print said selected franking value;

a digital electronic total register, for holding an accumulated value representative of the sum of the respective franking values used in preceding franking operations of the machine; and totaling circuitry, connected between said input register and said total register, for effecting addition of said selected franking value held in the input register to said accumulated value; whereby a new accumulated value is provided, to be held in said total register, after printing of said selected franking value, in place of said accumulated value previously held there, wherein [said franking value selection means, said input register, said total register and said totalling circuitry are together housed in an electronics unit of the machine, and the said electrically adjustable printing device is housed in a printing unit of the machine, said electronics and printing units being separable one from the other and having complementary coupling means for setting up operative electrical connections therebetween when the electronics unit is engaged with the printing unit.] *said machine comprises an electronics unit which houses franking value selection means, said input register, said total register and said totalling circuitry and a separate printing unit which houses the said electrically adjustable printing device and with which said electronics unit is engaged during the operation of the machine, said electronics and printing units nesting together with the electronics unit being carried by the printing unit and with the electronics unit fitting into a spatial envelope defined by the exterior dimensions of the printing unit, the electronics unit being readily separable from the printing unit and the electronics and printing units being connected together by means of a plug projecting from one said unit which directly engages a socket in the other said unit to set up operative electrical connections therebetween when the electronics unit is engaged with the printing unit, said plug and socket connectors being concealed when said electronics and printing units are nested together.*

For present-day purposes the electronics unit will generally include key-board-operated input means connected to the input register and operable to feed respective selected franking values into that register for successive franking operations of the machine.

An electronic postal franking machine designed to have various overall advantages as compared with some previously used electro-mechanical machines; for example, lower cost, better reliability and consequent reduced maintenance requirements, reduced bulk and weight, and in particular the normal requirement for the registers of such a machine to be checked and reset by the postal authorities can be greatly facilitated by the removable nature of the electronics unit which can have the form of a pocket calculator and house such registers in a readily transportable item.

In an electronic franking machine intended for use as a postal franking machine in the United Kingdom, there is provided additionally a credit register, i.e. a memory for storing credit information. Initially a maximum credit value is set in this register, by the Post Office, and the franking value is subtracted automatically from the value remaining in the credit register, whenever a franking operation is carried out with the machine. For such use in the U.K. it is necessary that existing credit and total expenditure values can be retained, in the registers of the machine, for an extended period of non-use.

It is also necessary that such a machine should be reasonably secure, so that information stored cannot be modified by unauthorised persons (at least without leaving evidence thereof). In particular the total register should be relatively highly secure, whilst the credit register should be alterable by Post Office personnel, for example, (but not others) relatively easily. Credit and total registers should preferably not be alterable during normal servicing of the machine. One way of providing security of "tote" information in the total register may be to provide that this "tote" register is replaceable, so that a new register is introduced each time a credit limit is reached, the old "tote" register being retained by the Post Office. Alternatively the tote register may be resettable using secure procedures.

Reference will now be made, by way of example, to the accompanying drawings, in which:

FIG. 1 is a schematic block diagram of a machine embodying the present invention, FIGS. 2 to 4 are diagrammatic block circuit diagrams of parts of respective embodiments of the present invention.

FIG. 5 shows a schematic external view of a part of an embodiment of the present invention, FIGS. 6A and 6B are together a more detailed block diagram of an embodiment of the present invention, FIGS. 7A and 7B and 7C are synoptic diagrams of respective parts of an operational algorithm of an embodiment of the present invention, FIGS. 8A and 8B and 8C are synoptic diagrams of respective parts of an operational algorithm of another embodiment of the present invention, FIG. 9 is a block diagram of an embodiment of the present invention, and FIG. 10 is a perspective view of the exterior of a franking machine embodying the present invention.

FIG. 1 shows operational components of a postal franking machine that has a non-volatile backing store, or register, 1 (discussed in more detail hereinafter) in addition to working registers 2 (in a so-called working register stack).

The working registers 2 include an input or value register, for storing a selected value to be franked in the next franking operation, which value is entered by way of a keyboard 3, and also include a credit register and a tote register. The current credit and tote values stored may be displayed on a display 4 by actuation of appropriate keys of the keyboard 3. When a value to be franked is set in the input register, a printer 5 is set to a condition for printing the selected franking value. Thereafter upon actuation of a "frank" key on the keyboard 3, a printing head of the machine is caused to operate and the value thus franked is added to the accumulated value stored in the tote register to provide a new accumulated value therein, and subtracted from the credit value stored in the credit register to provide a new credit value therein, by means of an arithmetic unit 6 which provides both addition and subtraction means. In practice this function of such a manually operated "frank" key will be performed by an electromechanical or optical internal switch which is automatically tripped, to cause the printing head to operate, upon insertion into the machine of an item to be franked. The manual key FK can be adapted to be used just for the printing of labels to be attached to packages too large to be inserted into the machine.

The non-volatile backing register 1 is provided for storing the values last present in the tote and credit registers, to provide for retention of up-to-date information, in the event of loss of power supplied to the working registers.

It will be appreciated that for use in some countries the presence of a credit register is not required and that a machine embodying the present invention could be built without such a register.

A control unit 7 governs operation of the other components of the machine. In the illustrated embodiment of the invention the unit 7 includes a Post Office controller which enables credit and tote information to be modified. In FIG. 1, broken lines indicate control links between unit 7 and other parts of the apparatus.

The Post Office controller can be considered as comprising a secure section and a highly secure section. The secure section may have a sealed input, which can only be used by breaking of a Post Office seal, by means of which a value stored in the credit register can be altered. The highly secure section may also have a seal which must be broken if access is to be gained, but will comprise in addition a device such as a combination lock, intended to deny access to all but authorised users. This highly secure section of the Post Office controller provides for alteration of a value stored in the tote register.

As an alternative to such a combination lock, or in addition, it may be provided that a preselected code word known only to authorised personnel must be entered into the machine via a keyboard in order that modification of tote information (and possibly credit information) be permitted. It will be appreciated that for some uses such security of tote and credit registers might not be required. For example only the presence of a seal might be sufficient.

Such a franking machine embodying the present invention, for use in the U.K., stores credit and tote information in its registers in binary coded form.

The embodiment of the present invention illustrated in FIG. 1 comprises also mail counters 8. These counters can enable a daily record of the amount of mail franked to be compiled, the information being retrievable by actuation of an appropriate key on the keyboard 3.

There are several different types of store, for digital information storage, presently available. Such stores may be classified into two groups: volatile and non-volatile stores.

Non-volatile stores are devices which retain their information even after removal of power supplies thereto, e.g. magnetic storage systems. Magnetic storage systems tend to be large in both physical size and memory capacity, and they may also be expensive, and in the franking machine embodiment illustrated in FIG. 1 these are not employed.

Volatile stores are devices which may loose their information when power supply is removed, e.g. generally available Bipolar/MOS Registers. However, by providing registers are battery supply to a volatile store an effectively non-volatile store may be obtained.

Thus, as shown in FIG. 2, a standby battery 16 may be provided, in a franking machine embodying the present invention, as auxiliary supply means, to take over power supply to a volatile store 11 (which may be used as a total register, for example) in the event of failure of mains power supply. In the embodiment of FIG. 2, the battery will also supply power to logic circuitry 10 so as to enable tote information, for example, to be modified in the absence of mains supply; however, in the illustrated embodiment the battery does not supply electromechanical components (e.g. a printer), since this might result in too great a power drain on the battery; accordingly, franking cannot take place when the "standby" battery 16 is supplying power.

Thus, in a comparison of the embodiments of the present invention of FIGS. 1 and 2, in the embodiment of FIG. 2 the function of the backing store of FIG. 1 is fulfilled by the volatile store 11 of (FIG. 2) in combination with battery 16, volatile store 11 also constituting working registers 2 (or at least part thereof) of FIG. 1.

However, as shown in FIG. 1, it is possible to provide a franking machine embodying the present invention in which working reegisters aree of a volatile type, there being a separate non-volatile "dump" or "backing" register 1 constituting back-up storage means provided for use in the absence of mains supply, information from the working registers being automatically stored in the "backing" register upon loss of supply, but being automatically reetrievable when supply is returned.

As shown in FIG. 3, in a franking machine embodying the present invention in which such a non-volatile "dump" or "backing" register 18 is provided as a non-volatile back-up store in addition to a volatile store 11, a battery 16 may also be provided to ensure that, in the event of loss of mains power, logic circuitry 10 can be operated together with the volatile store 11 to ensure that information is properly transferred to the backing register 18. In this case the electronic sections of the machine may also remain operable in the absence of mains supply but, as in the embodiment of FIG. 2, electromechanical components cannot be operated when mains supply is absent.

When a volatile store with a back-up battery is employed in an embodiment of the present invention to provide an effectively non-volatile register, the battery used must be highly reliable.

Two possible types of battery or cell are at present considered as probably providing the most desirable choices:

(i) a new Lithium cell, developed by Saft Ltd. This can be manufactured to a smaller size than a Standard U2 cell and each individual cell has a terminal voltage of around 3.2 volts. Such cells are of a non-rechargeable type, but have a shelf life of approximately ten years. When the battery is employed merely as a standby, current drain might be approximately 80 nanoamps ($80\times10^{-9}$) to store 20 digits (10 per memory) in the stores being supplied. Thus, retention over a number of years is possible. In use in an embodiment of the present invention, it can be arranged that such a battery is automatically cut out of circuit when the mains is applied, and vice versa. In embodiments of the invention such as are shown in FIGS. 2 and 3, for example, a mains power supply, of the franking machine, and a battery can be connected to a tote or credit register (the volatile store 11) through respective diodes 13 and 14. The battery provides lower voltage than the mains power supply. The capacitor prevents the power supply to the store 11 dropping below a preselected operating voltage when overcoming reverse bias on diode 13 or 14 during change-over from battery to mains power supply, or vice versa, respectively.

(ii) Rechargeable Nickel/Cadmium cells. These are usually of a similar size to the previously mentioned batteries. It can be arranged that automatic recharging takes place when the machine in which they are employed is in use and is receiving mains supply. However, in an embodiment employing such a cell it is to be noted that if the machine is left in an unused condition for more than four months it is possible that the information registered may change or be lost. In an embodiment in which this is a possibility, it can be arranged that any change in information in the store will always be down in value so that the liability will not be that of the Post Office.

Solid state circuitry in the embodiment of FIG. 1 incorporates the functions of the control unit 7, arithmetic unit 6, and Working Registers 2. Although discrete I.C.'s can be used as the basis of this circuitry, it is possible to implement the whole logic on a single chip in the form of an LSI device.

The two major classes of digital I.C. technology at present are the Bipolar and MOS classes. The Bipolar class can itself be divided into several classes, viz: Standard Bipolar, Isoplanar, Collector Diffusion Isolation and $I^2L$)integrated logic. MOS devices can also be divided into five different classes, viz: P-Channel, N-Channel Complementary MOS (CMOS), VMOS and DMOS. Each of these classes is again sub-dividable into different classes according to the fabrication and structure of their gate region.

A brief survey of the various available functional logic blocks (only available for a limited number of the above-mentioned classes of I.C. technology) suggests that for a franking machine embodying the present invention, those belonging to the CMOS class might provide the best cost/performance trade-offs at present. Compared with other medium-speed (50 NS propagation delay) logic blocks, CMOS blocks have relatively low power dissipation, for example 10 NW per gate. For TTL (transistor transistor logic) blocks the equivalent value would be of the order of 1 mW. Further, CMOS blocks can tolerate a relatively wide range of power supply voltages, for example from 3 V to 15 V, thus reducing any need for regulation of the power supplies, and have a good immunity to noise, typically up to 45% of the supply voltage, so that they can be employed in an electrically noisy environment with little need for complex filtering or shielding arrangements.

CMOS blocks may be slightly inferior to TTL blocks in terms of speed, and lower in gate density per unit silicon area than N-Channel MOS blocks, but these disadvantages appear to be only of secondary importance for present purposes.

The TTL and CMOS blocks at present readily available are not exactly equivalent (CMOS blocks have additional functions), but for comparison purposes it can be said that CMOS blocks are generally more expensive for both small and large quantities of particular devices. However, overall system costs using CMOS blocks could be less, owing to cheaper power supply requirements. Where large quantities are involved, i.e. in excess of 25,000 per annum, special integrated circuits using either TTL or CMOS technology, e.g. custom built chips or Microprocessor units, become economically viable, and their use can result in savings in both component and assembly costs.

As discussed above, with reference to FIGS. 1 and 3, in one embodiment of the present invention providing a postal franking machine there are two types of memory arrangement, viz: Working registers and a backing register (a non-volatile store).

In addition to the working registers there may be a programme store in the control unit 7 of FIG. 1. Thus a programmeable store in the form of an ROM (Read Only Memory) or a PROM (Programmeable Read Only Memory) may be needed to store machine instructions (which may be in micro-code). CMOS technology can again be used, to conserve power.

As mentioned above, an intrinsically non-volatile back-up memory can be used in the above-described embodiment of FIGS. 1 and 3 for preserving credit and tote information even in the absence of mains power to the machine. In this case, the operating system can be such that the non-volatile backing register is kept idle during the course of normal operation of the machine, and when the machine has reached a quiescent or static state, and has remained in that state for a defined time (say tens seconds has elapsed since completion of a last preceding franking operation), idle-state monitoring means provide a control signal which automatically causes the non-volatile backing register to be updated with the latest contents of the credit and tote registers.

In computer systems, intrinsically non-volatile backing stores are usually magnetic in nature. Owing to their size/weight and power consumption (during operation) presently available magnetic stores are not entirely suited for use as backing registers in franking machines embodying the present invention. However, a practically non-volatile semiconductor store, known as an MNOS (Metal-Nitride-Oxide-Semiconductor) device has been identified which seems likely to satisfy the requirements for use as such a backing register. Storage time for such a device depends on the amplitude and duration of writing pulses employed therewith. Plessey and NCR market such devices in 64-bit (e.g. Plessey NOM 401C 8×8 MNOS array) and 1024-bit arrays. Such devices can be made with rated minimum storage times of 1 day, 1 year, and 100 years, respectively for write times (per word) of 1 microsecond, 100 microseconds, and 10 milliseconds.

The power consumption of these devices during dynamic states is very close to that typical of CMOS devices. However, they require special interfacing circuitry and need a relatively high negative supply voltage, in the region of −30 V, during write/erase operations.

In an embodiment of the present invention such a 64-bit Plessey MNOS store can be used, write pulses having a pulse height of −35 V and a duration of 100 μsec, giving a storage time in the range from 5 to 10 years.

It is also possible that MNOS devices could be used as working tote and credit registers in an embodiment of the present invention, and thereby obviate any necessity for the additional provision of a "dump" or backing register.

An embodiment of the present invention employing such a non-volatile store (providing a tote and/or a credit register) is illustrated in FIG. 4. The non-volatile store is indicated at 19 and is provided with a capacitor 20, which is maintained in a charged condition when mains power supply is present, which when mains power is cut-off provides a temporary power supply so that information can continue to be safely entered into the store, to complete an already commenced storage cycle, when mains supply is unexpectedly lost. Thereafter, as opposed to the situation in the embodiments of FIGS. 2 and 3, the electronic logic circuitry 10 is inoperable, as are the electromechanical components 12, until mains supply power is restored.

Three shift registers, for example, can be used, in an embodiment of the present invention, as working registers to store franking value (current value to be franked), credit and tote data. The input register in an embodiment of the present invention can be a 4×4 bit (4 decimal digits) register and the credit and tote registers can be 10×4 bit (10 decimal digits, or 9 decimal digits plus a half) registers.

A wide range of seven-segment display units are available which can be considered for use in embodiments of the present invention. These include Filamentary, Gas Discharge, V.L.E.D. (Visible Light Emitting Diode), Liquid Crystal and phosphor-Diode devices. Bearing in mind such factors as cost, appearance and portability, for a franking machine embodying the present invention the type of display unit that at present seems to be most viable commercially is the V.L.E.D. unit.

Reliability and degradation seem to be the main problems with liquid crystal display units. The operational life of such a display unit may be as short as 200 hours. In comparison to this, V.L.E.D. units are showing m.t.b.f. (mean time between failures) values of greater than 200,000 hours when operating under quite severe environmental conditions.

In terms of current drain from a supply (which is one of the most important factors to consider in the design of an off-line battery-operated electronic franking machine) liquid crystal devices have an undisputed advantage. However, to counter this, V.L.E.D. devices have additional speed that can enable power consumption to be reduced through the use of multiplexing techniques.

A possible configuration for display means is shown at 50 in FIG. 5. The display illustrated comprises two portions, a diagnostic fault code (explained in more detail hereinafter) display portion 51 and a numerical display portion 52 for displaying credit tote and franking values for example.

For entering information to the franking machine of FIG. 2, and for serving other functions, e.g. providing for display of credit, tote and selected franking values on demand, a keyboard is provided, for example such as is provided for a pocket calculator. A possible keyboard arrangement can be as shown at 3 in FIG. 5. In FIG. 5, keys of the keyboard are designated 53, and an on/off switch provided thereon is designated 54. The following is a Table of symbols used on the keyboard of FIG. 5, explanation of various terms used will be given hereinafter.

TABLE 1

| | operation indicated |
|---|---|
| Key Board Legend: | |
| 1. 0–9 | Value selection. |
| 2. L.B. | Label select. |
| 3. C.L. | Clear value. |
| 4. T.D. | Tote register display. |
| 5. H.V. | Set high value. |
| 6. F.K. | Operate machine. |
| 7. C.D. | Credit register display. |
| Operable Only By Post Office: | |
| 8. P.C. | Programme clear. |
| 9. C.R. | Modify credit register. |
| 10. T.R. | Modify tote register. |
| 11. + | Add value register to credit or tote registers. |
| 13. − | Subtract value register from credit or tote registers. |
| 13. CA:CB:CC:CD: | Security code buttons. |

A possible alternative key-board can afford a set of key functions, for use with an embodiment of the present invention such as is shown in FIGS. 3 or 4 for example, as listed in the table below, in which "V.R." stands for "Value Register" and denotes the register alternatively referred to herein as the input register. The number of keys could probably be reduced by the use of multiplexing techniques.

TABLE 2

| Keys | No. | Type | Function | Notes |
|---|---|---|---|---|
| 0–9 | 10 | Single shot | Decimal Number Entry | |
| ½ | 1 | Single | 0.5 Entry | |

TABLE 2-continued

| Keys | No. | Type | Function | Notes |
|---|---|---|---|---|
| | | shot | | |
| TD | 1 | Single shot | TR Display | |
| CD | 1 | Single shot | CR Display | |
| FCD | 1 | Single shot | F.C.C. Display | May be included in the keyboard |
| SCD | 1 | Single shot | S.C.C. Display | |
| LCD | 1 | Single shot | L.C. Display | |
| TCD | 1 | Single shot | T.C. Display | |
| HV | 1 | Single shot | Set High Value | |
| FK | 1 | Single shot | Operate Franking | |
| CL | 1 | Single shot | Clear Value or Input Register and Diagnostic Codes | |
| PC | 1 | Single shot | Programme Clear | Operable only by Post Office |
| CR | 1 | Single shot | Modify C.R. | |
| TR | 1 | Single shot | Modify T.R. | |
| + | 1 | Single shot | Add V.R. to C.R. or T.R. | |
| − | 1 | Single shot | Subtract V.R. from C.R. or T.R. | |
| POS/$\overline{POS}$ | 1 | Single Pole Double Throw | Post Office security switch | |
| LC | 1 | Single Shot | Lockout clear | Operable only by Post Office |
| SCS* | 4 | Single Shot | Secret Code Switch | |
| LS | 1 | Single Pole Single Throw | Label Selection Switch | |

*SCS could be increased from 4 to 12 in number for production machines.

CD and TD (credit and tote register display switches) are arranged in "exclusive or" form, i.e. only one of them could be effective at a time.

To modify amounts stored in Tote and Credit registers, the data keys (number keys 0 to 9 and ½) must be used in conjunction with the "C R", "T R", "+" (add) and "−" (subtract) keys. In a machine such as that of FIG. 1, the latter four keys are under the control of the Post Office Controller. Change of the Tote register (operation of "T R" and either "+" or "−" and be made possible only by operating "POS" and entering a special identity code through "SCS" (or by operation of code buttons $C_A$, $C_B$, $C_C$ AND $C_D$ on the keyboard of FIG. 5). If the right code is not provided at the first attempt, the system will "lockout", i.e. no credit/tote modification will be possible. Normality can then only be restored by operating the "LC" switch. This switch will be housed in the "high security" section of the machine which is only accessible to Post Office personnel. Alternatively, for example in a machine having a keyboard as shown in FIG. 5, to detect a wrong code entry, a lockout device in the form of a self rupturing transistor could be used. After operation of this device, the system could only be brought back into operation by replacement of the ruptured device. Thus means can be provided whereby any unsuccessful attempt to operate keys controlled by the Post Office controller will leave some indication that the attempt has taken place.

The keys available on a keyboard in accordance with Table 2 in general have the same designations of functions as are explained in Table 1, however the keyboard of Table 2 can have additional keys FCD, SCD, LCD and TCD which relate respectively to First Class Display, Second Class Display, Label Counter Display and Total Counter Display. These keys would be provided on a machine having facilities for storing separately the number of items of mail franked which are franked respectively with first class postage value and second class postage value, the number of labels (as opposed to letters, the labels being for use on large packages or parcels for example) franked and also the total number of items of mail franked, for example on a day to day basis. The machine of FIG. 1 has such facilities as indicated by the mail counters. It is also possible to provide, in a franking machine embodying the present invention, a number of registers (for example non-volatile) for recording respectively the amounts of mail franked by different departments within a firm. Each register would, for example, be actuated by operation of an appropriate key provided on the keyboard. This would provide the user with an indication of departmental postal costs for example.

A franking machine embodying the present invention may employ a printing module, for franking selected values entered in the value register, of construction generally similar to that of a known printing module made available by English Numbering Machines Ltd. under the Trade Mark "UNIDEC".

Such a module has printing wheels which can be indexed round by pulses supplied to a 24 volt coil situated within the module. As the angular position changes, so also does a coded readout signal at output pins of the module. This enables a comparison to be made with an input key signal, so checking for correct location of a required digit. With an operating speed of 40 digits/sec, the maximum time needed for selection of a particular value can be kept to about 250 msec.

More specifically, the printing wheels are set to a selected franking value (entered via the keyboard to the value register V.R.), and to ensure identity of the value entry (contents of V.R.) with the value set up on the printing wheels, the module generates a coded BCD signal which corresponds to the values to which the printing wheels are set at any given time. This code is compared with the contents of the V.R. Only when identity is achieved will the machine be allowed to proceed to its next logical operation. This comparator operation is allowed to continue for a finite time only (typically 5 secs) after which time if identity is not achieved the print wheel mechanism will be locked off and, for example a diagnostic fault code "P" (as explained hereinbelow) will be displayed. This monitoring procedure may save unnecessary print-wheel rotation, thereby prolonging the operational lifetime of the printing module, due to possible malfunctions of the code identifying means in the module. It seems likely at present that such a printing module might have three, extendible to four, Delrin printing wheels, each having ten printing dispositions. The printing dispositions of the wheel at the most-significant digit location are respectively for printing the figures 1 to 9 and a blank, those of the wheel in the least-significant-digit location are alternately for printing the value ½ and a blank, and those of the or each wheel at an intermediate-digit location are respectively for printing the figures 0 to 9 inclusive. Peak power consumption of the module during printing is likely to be of the order of 4.25 Watts. Such a module may have a "dead-stroke" driving arrangement, employing two 24 Vd.c. solenoids, with noise damping, instead of a rotary driving motor. The module can also be provided in known manner with means for providing mechanically a visual display of the value to which the printing wheels are set.

FIGS. 6A and 6B show operational components, of a franking machine in general accordance with FIG. 2, including a selection of keys present in a key-board of the machine, e.g. numerical keys 601 for keying in the digits 0 to 9, a high-value (HV) key 602; a Reset key 606, and various other keys, for example a clear key 603, a credit key 604, and a tote key 605. This embodiment has a 10-digit L.E.D. display 622 and a three-digit and one-half print head (printing module) 621.

Selection of a value to be franked is carried out by depressing the appropriate numerical keys 601 in order from the most significant digit to the least significant digit.

In FIGS. 6A and 6B, 611 to 618 are respective trigger devices T, for generating, in response to pulses from an appropriate key, 601 to 608, pulses of an improved shape.

If a high value is required to be franked the HV key 602 must be depressed. Actuation of key 602 operates a lock as shown in the Figures. The lock is an inhibit circuit such that the machine will not operate when a high franking value is selected unless the High Value key 602 is depressed. This key resets itself after each operation, requiring a fresh operation of HV for the next franking operation, so as to prevent inadvertent repetition of a high-value franking.

As can be seen in the Figure a selected value, input through key 601 is delivered from trigger 611 to an input of a 2×4 bit comparator 638 which has another input connected to receive the value stored in credit register 619, and thus the value selected is compared digit by digit with the value stored in the credit register 619, which in the illustrated example is a 48-bit, 4-line register, and if (but only if) sufficient credit to cover the selected value is available, franking operation is enabled by delivery of a pulse from an output of comparator 638 to AND gate 624. If only ½p is left in credit, this may be used, but then the machine will lock off (franking is disenabled, and a display indication of this may be given by means of a diagnostic fault code as explained hereinbelow). Alternatively the machine could be designed to lock off when the credit value falls to some predetermined non-zero value.

Only one display is incorporated; this normally shows the selected franking value. If the Credit or Tote value is required to be displayed, this can be effected by depressing the appropriate key "CREDIT" 604 or "TOTE" 605. This function is carried out by display selector 637, which has respective inputs for receiving signals indicative of the contents of the credit and tote registers, the content of the input register, the result of the comparison carried out at comparator 638, and control inputs connected to keys 604 and 605 which are used for indicating that display of credit or tote values is desired. An output of the display selector is connected to a decoder 633 for providing a display of a selected item on the display 622.

The required value having been selected, the information will have been transferred to the input register 620 (V.R.), in this case a 16-bit, 4-line register, via AND gate 624. The print head 621 is driven by a power driver 631 and provides an output indicative of the instantaneous franking value set therein to a comparator 630 which also receives the value signal entered by means of the keys 601. When the comparator indicates identity of the instantaneously set franking value of the print head and the franking value entered by keys 601 the power driver is switched off. If the print head fails to set to the entered franking value with a preselected time then it is disenabled. If a letter or label is then placed in a throat of the machine, a trip switch 607 (TRIP) will operate and by way of AND gate 627 a pulse is delivered to power driver 641, and franking will thereupon be effected.

A sensing switch is provided adjacent to the further limit of printing movement of the print head 621, to ensure that no arithmetic functions are performed until franking is actually occurring. When the sensing switch is actuated, the value in the input register 620 is added to that in a tote register 623, in this case a 48-bit, 4-line register, and subtracted from that in the credit register 619.

Thus the value set on the machine is not transferred to the tote or credit register until, or just before, franking (printing) is actually effected. This can be ensured, for instance, by having a micro-switch or a photoelectric sensor arranged to be actuated just before, or upon, contact of the print head with the item being franked. This can ensure that if there is a mains failure it is very unlikely that a value will be transferred to the tote or credit register without franking having taken place.

This stage complete, the input register 620 will be emptied if "high value" has been selected, but will remain ready for further franking operations if the value therein is a "low" value (less than 1·00 pound for a U.K. franking machine). If a change of value is required the CLEAR key 603 is depressed, and a different value can then be entered. Actuation of the clear key causes a signal to be derived from AND gate 625 (in dependence upon the condition of the high-value lock) which allows a signal from 1-shot generator 636 to clear the register 620. For rewriting the contents of the input, credit and tote registers, respective rewrite connections are provided to AND gates 626,629 and 628 respectively. The respective outputs of these AND gates are connected to inputs of the input, credit and tote registers, respectively, for rewriting thereof.

There may also be provided a maximum tote value protection arrangement, whereby overflow of the tote register, due to the addition of too high a value thereto, and possible resultant resetting thereof to an incorrect value is prevented.

When the machine is plugged into the mains, the display 622 may be on continuously; alternatively it can be arranged that the display operates intermittently, thereby attracting the operator's attention. The display is driven from a 40 kHz clock 640 via a ×12 counter 635 and a 4-line in, 16-line out demultiplexer 634. The clock 640 also provides, via a sync. signal generator 639, synchronisation signals for the input register 620. For example, intermittent display may be provided only when a high value has been entered for franking, thereby calling this to the operator's attention. However, when the machine is on standby battery supply the display will preferably operate for a short period (5 seconds) only, when a value is keyed into the input register, and will then require resetting to obtain a further 5-seconds display. This safeguard is necessary to ensure reasonable battery life, since the display is a high current drain part of the circuitry.

The reset key 606, which is intended to be operated by authorised personnel only, operates a blanking circuit 632 for blanking the display 622. Operation of this resetting key providing such further 5-second displays.

A power switch 609 and an add-to-credit key 610 are also provided. Before these keys can be operated a post office seal must be broken, for example.

In dependence upon an output of the input register 620, the triggering of a print detect sensor 608 and of the add-to-credit switch 610 a high value display control circuit 642, a complimenter 643 and an added 644 are operated.

In addition to the keyboard input, the machine might also be provided with automatic input means comprising a weighing device, for example electronic or electro-mechanical, for providing an input signal in accordance with the weight of say an envelope or package to be franked, whereby the franking machine automatically selects an appropriate postal value and franks the envelope or package (or a label therefor).

An electronic franking machine embodying the present invention can also be provided which can be linked to an automatic paper handling system. For example ERTMA 750-558 performs bundle separation and bundle control activites by automatically reading codes typed on documents. These codes, which given an indication of weight, can be used for automatic selection and franking of envelopes for the bundles for example.

An electro-mechanical back-up tote register could be provided in addition to the electronic register.

A machine embodying the present [, for example,] is composed of two mutually separable main parts, one of which comprises the printing unit, or module (PRINT HEAD), and the other being an electronics unit, or module, of approximately the size of a pocket calculator, which houses the registers and logic circuitry and includes the display and the keyboard. The electronics unit and printing module have complementary coupling means (for example, conventional plug and socket arrangements) for setting up operative electrical connections between the circuitry and the printing device when they are engaged. The exterior appearance of such a machine is illustrated in FIG. 10 in which 100 is the detacheable electronics unit and 101 is the printing module. *As illustrated, the electronics unit 100 and printing module or unit 101 are nested together with the electronics unit 100 being carried by the printing unit 101 and the electronics unit fitting into a spatial envelope defined by the exterior dimensions of the printing unit. The plug and socket connectors (not shown) will, of course, be concealed when the two units 100 and 101 are nested together. The relatively light electronics unit which, as shown, is generally in the form of an electronic calculator, can then be disengaged from the rest of the machine, and taken separately to a Post Office, for recordal of the tote value and entry of further credit. In this event credit and tote values would, if necessary, be transferred to a non volatile backing store. For the printing module there should preferably be provided interlock means whereby, when the electronics unit is detached therefrom, operation of the printing module is prevented, thereby removing the possibility of unauthorised and unrecorded use. The electronics unit has an aperture, normally closed by a cover bearing a Post Office seal, providing for access to means for re-writing the credit and tote values. The mechanical arrangement of these means and the said cover is such that the latter cannot be securely closed unless the rewriting means are deactuated. The rewriting means may comprise a single key operable to cause an amount keyed on the normal keyboard of the machine to be fed into the credit register. The unit has interlock means such that when a new credit value has been set into the input register, it will not enter the credit register if too large an amount is already present there. This will prevent overloading.*

As a mains power supply may not be available at a Post Office counter to which the machine or separate unit is taken for recordal, the machine may have a switch or key for causing the display means (which normally would consume a relatively large amount of energy) to be powered from a battery. This switch or key may be lockable and/or sealable in an "off" condition, the arrangement being such that the switch or key cannot be locked in the "on" condition (causing the battery to power the display means). Alternatively, or in addition, the machine may incorporate time delay means to disconnect the battery from the display means after a short period, say 5 seconds.

It is possible that, at the Post Office, the detachable unit could be powered from mains supply by means of a plug in power adaptor such that when the adaptor is plugged in the battery will be automatically switched off.

The machine part having the printing module may include a feed for feeding items to be franked, such as envelopes or labels, which feed preferably uses only solenoid actuators to transport such items.

Also, there may be provided in the machine part having the printing module a further register for storing tote information over the whole lifetime of the machine. This register could be electromechanical or mechanical.

As mentioned above, with reference to FIG. 5, it is possible to provide, in an embodiment of the present invention, means whereby upon occurrence of a fault, or upon attempt of a non-permissible operation, an indication is given, on a display, of the nature of the fault which has occurred or the reason for an operation being impermissible. For example, as indicated in FIG. 5, single letter diagnostic fault codes are displayed in a portion of a display. By way of example the following code letters, indicative of faults, as set out in table 3 hereinbelow may be given.

TABLE 3

| Code Letter | Fault indicated |
|---|---|
| L | credit register value less than selected franking value |
| P | printer error |
| F | mains fault |
| E | battery/supply too low |
| H | total register value too high (most significant digit = 9) |

It will be appreciated that, in any given embodiment of the present invention only the appropriate error codes will be provided. For example, in a machine having a non-volatile store as shown in FIG. 4, error code E need not be present.

Error code L indicates that a value selected to be franked is less than credit remaining in the machine, in which case franking is prevented. The machine may then lock off entirely or alternatively the franking of an appropriate lower value may be permitted. Of course, if no credit register is provided this code is not necessary.

Code letter H indicates that a present maximum value for the tote register will be exceeded if the selected desired value is franked. The machine may lock off completely or permit franking of a lower value.

FIG. 9 illustrates schematically an embodiment of the present invention which employs non-volatile working registers, or effectively non-volatile working registers employing a volatile store with a back-up battery. As is indicated in FIG. 9 the working registers may be modularly replaceable so that either a true non-volatile store or an effectively non-volatile store are alternatively employable in one machine.

The machine of FIG. 9 also includes mail counter 998 which comprises registers for storing information relating to different classes of mail franked as mentioned hereinbefore with reference to the keyboard of Table 2. The mail counter 998 thus comprises a first class mail counter 981, a second class mail counter 982, a label counter 983, and a counter 984 for the total number of items of mail franked.

The contents of any one of counters 981 to 984 may be displayed on display 994 by actuation of appropriate keys on keyboard 993. The embodiment of FIG. 9 further includes a printer 995, a control 997 and arithmetic unit 996 which may of similar construction to the corresponding items in FIG. 1. In FIG. 9, control links between control 997 and other items are indicated by broken lines. In the embodiment of FIG. 9 working registers comprise an input register 992 and credit and tote registers 991 or 990, which latter may be modularly interchangeable. The non-volatile credit/tote meter 991 may comprise an MNOS memory as mentioned above, whilst the unit 990 may comprise a CMOS memory, backed by a battery.

If an MNOS unit is employed then either mains supply via a power adaptor is required to drive the unit, or a high voltage battery supply (e.g. −30 V) is necessary.

The machine schematically illustrated in FIG. 9 is structurally divided into two separable units as shown in FIG. 10.

Figure 7A:
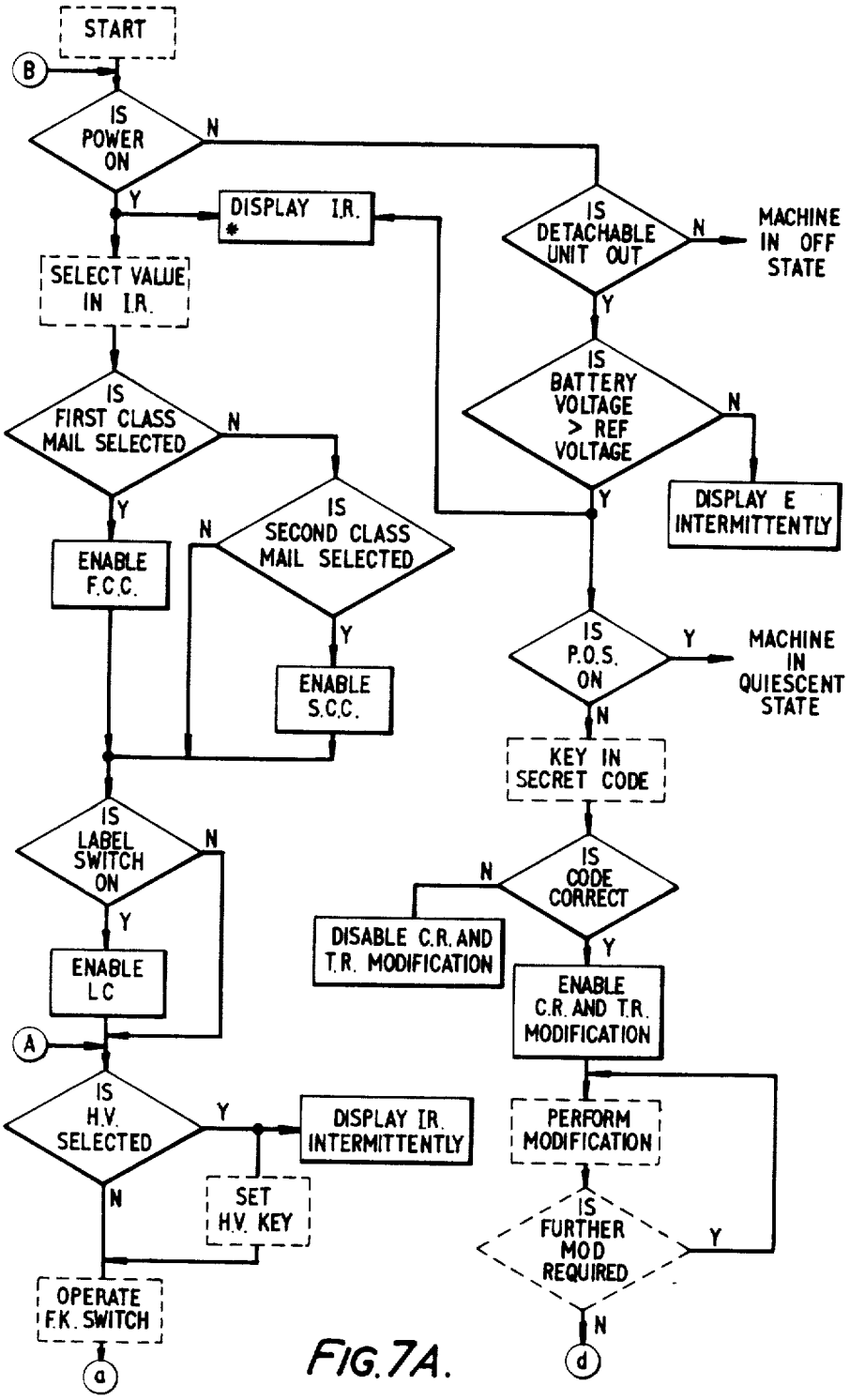
FIGS. 7A, 7B and 7C illustrate an operational algorithm for a machine as described with reference to FIGS. 1 and 3 for example.
Figure 7B:
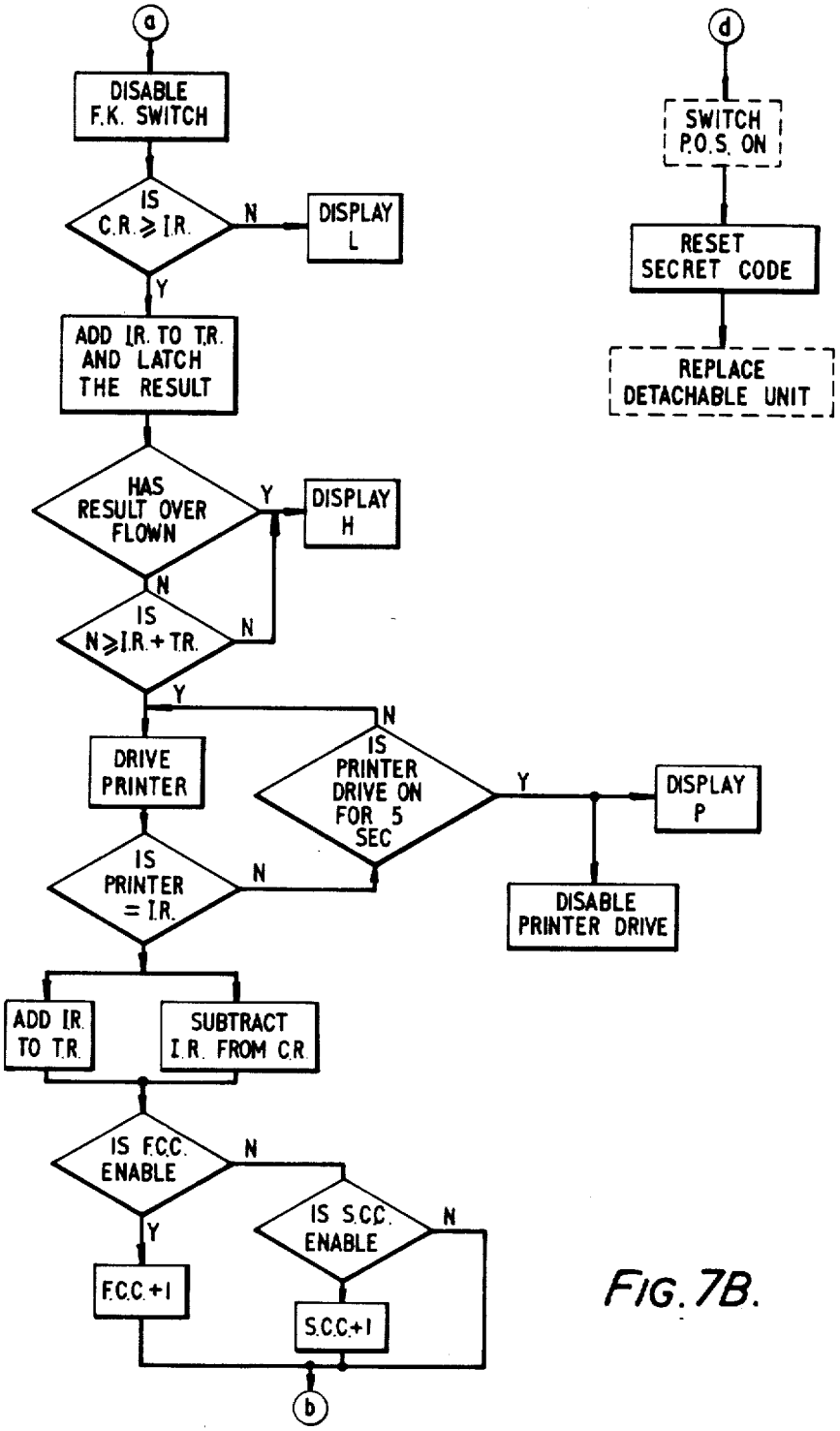
Figure 7C:
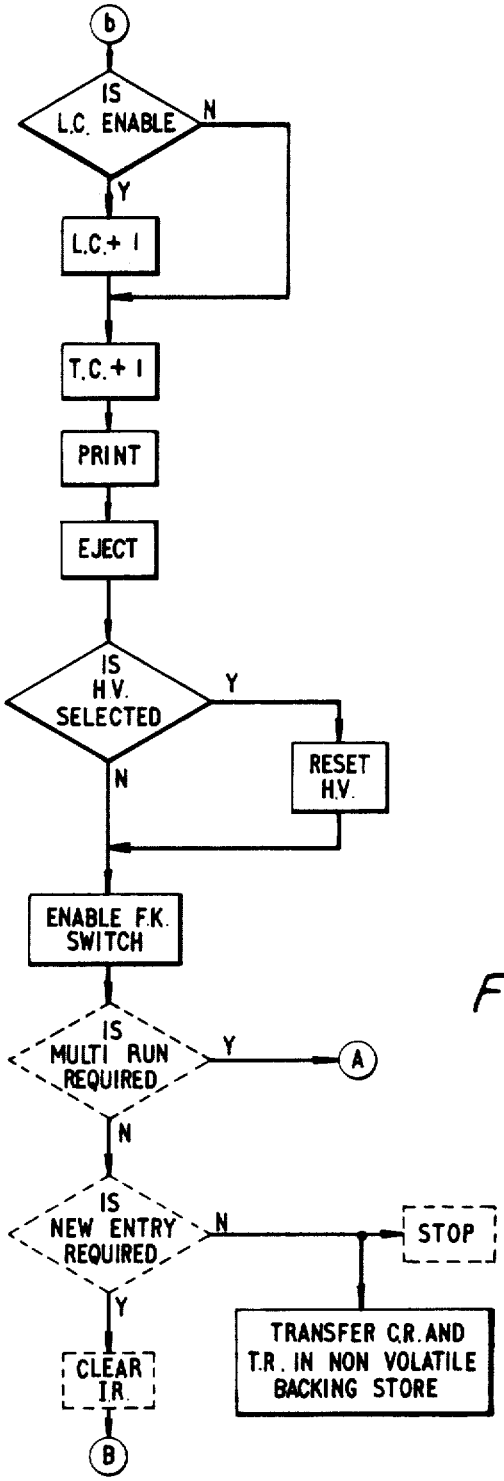

The following table provides a key for assistance in understanding the algorithms of FIGS. 7 and 8.

TABLE 3

| | |
|---|---|
| ——— | Automatic operation |
| — — — | Manual operation |
| I.R. | Value or Input Register |
| C.R. | Credit Register |
| T.R. | Tote Register |
| N | A Programmeable Number |
| F.C.C. | First Class Counter |
| S.C.C. | Second Class Counter |
| L.C. | Label Counter |
| T.C. | Total Item Counter |
| P.O.S. | Post Office Security Switch |
| H.V. | High Value |
| F.K. | Frank |
| Diagnostic code: | |
| L | C.R. Too Low |
| H | T.R. Too High |
| P. Printer Setting Error | |

TABLE 3-continued

| | |
|---|---|
| E | Battery Voltage Too Low |

Note:
*At any one time the following items are displayable via Key Board: F.C.C., S.C.C., L.C., T.C., C.R., and T.R.

Figure 8A:
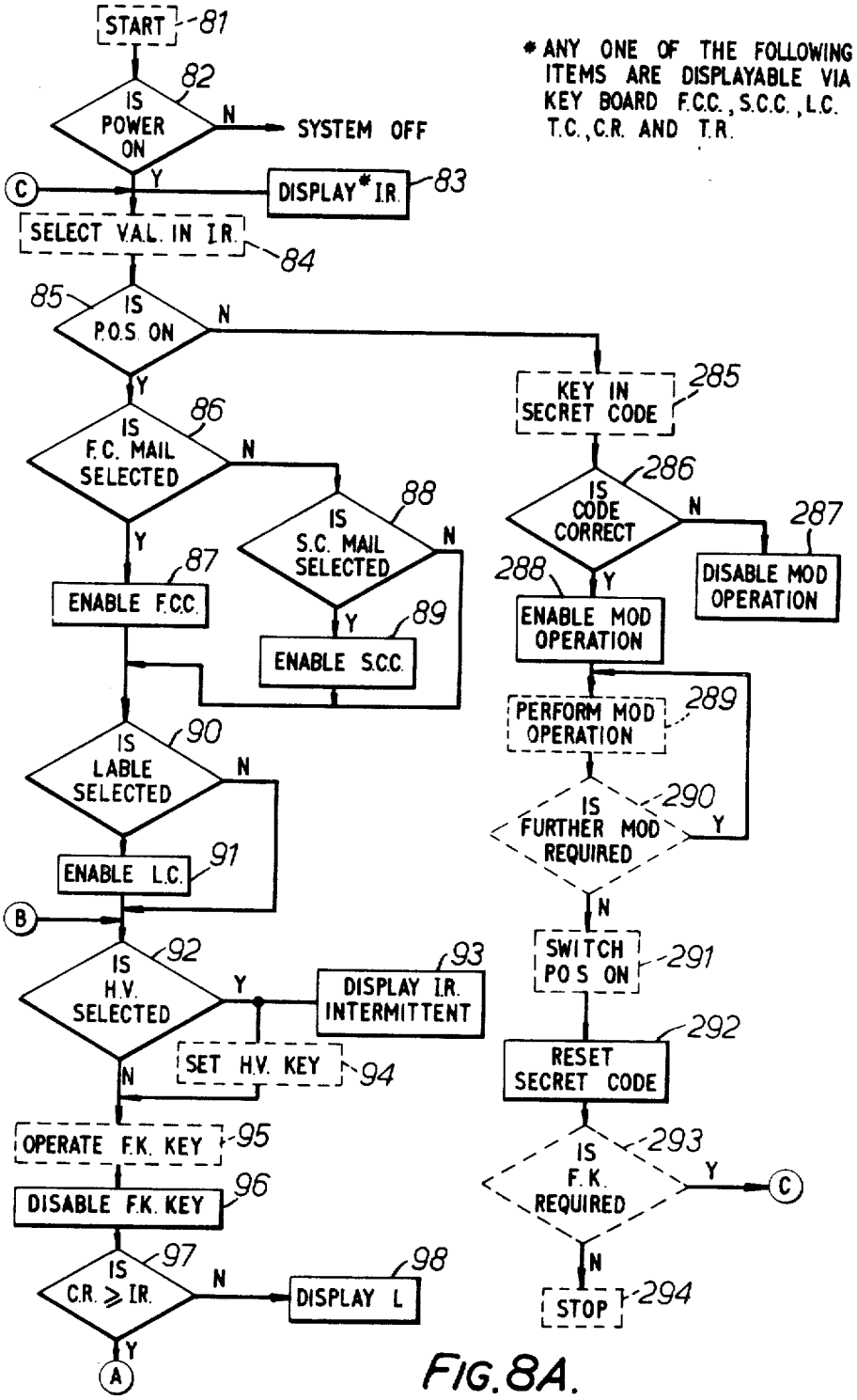
FIGS. 8A, 8B and 8C illustrate an operational algorithm, somewhat simplified as compared with that of FIGS. 7, for a machine as described with reference to FIG. 9. The algorithm corresponds generally to the use of a configuration as shown in FIG. 4 in an embodiment of the present invention.
Figure 8B:
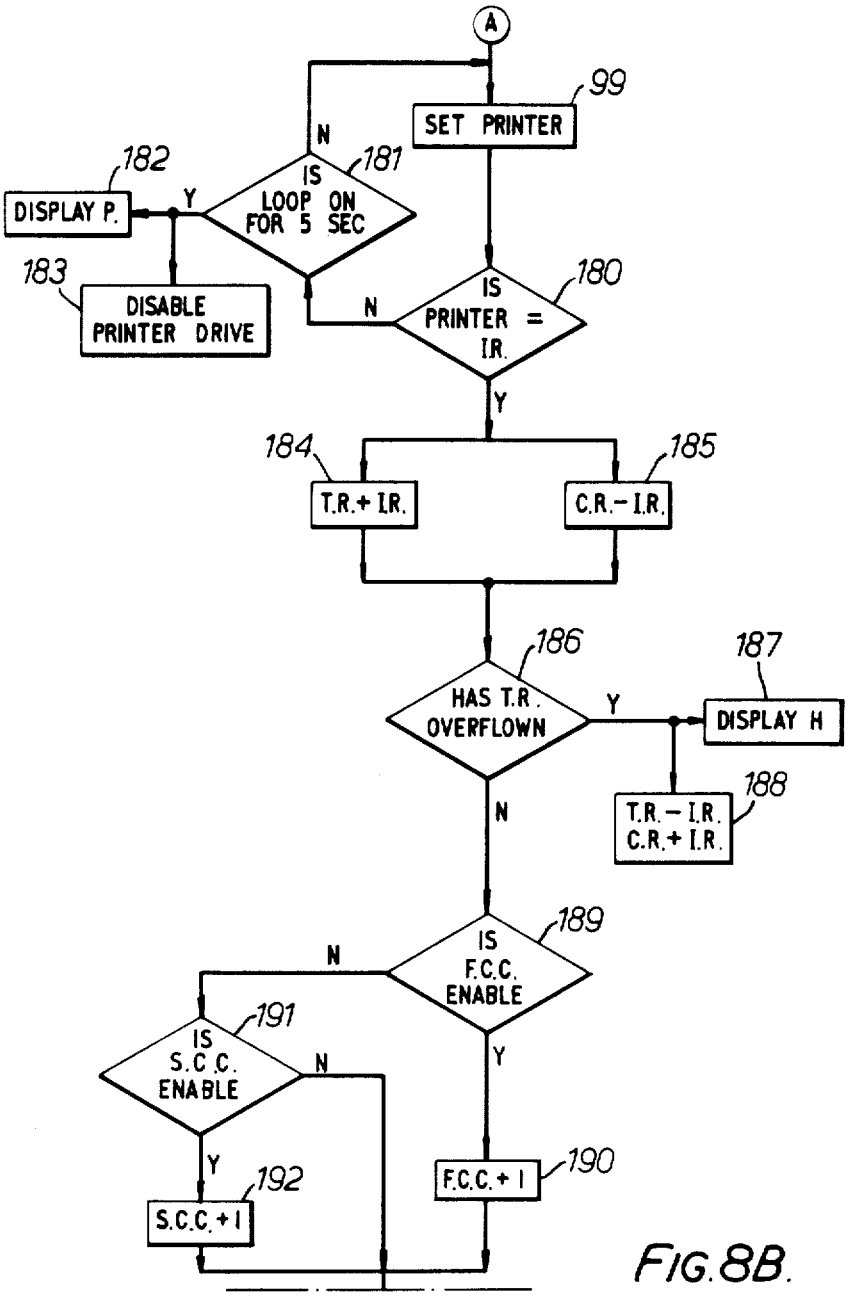
Figure 8C:
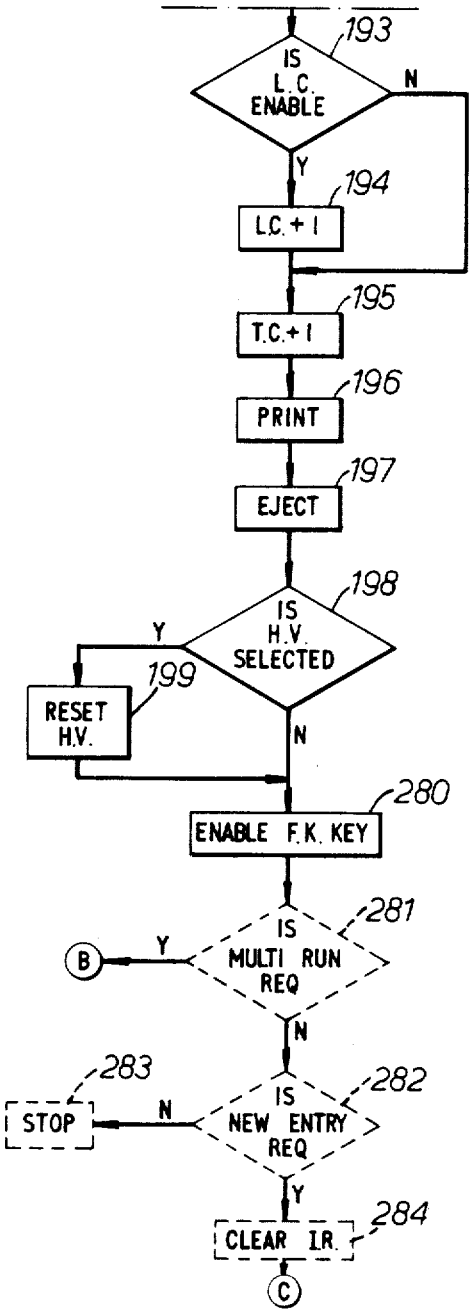
Figure 9:
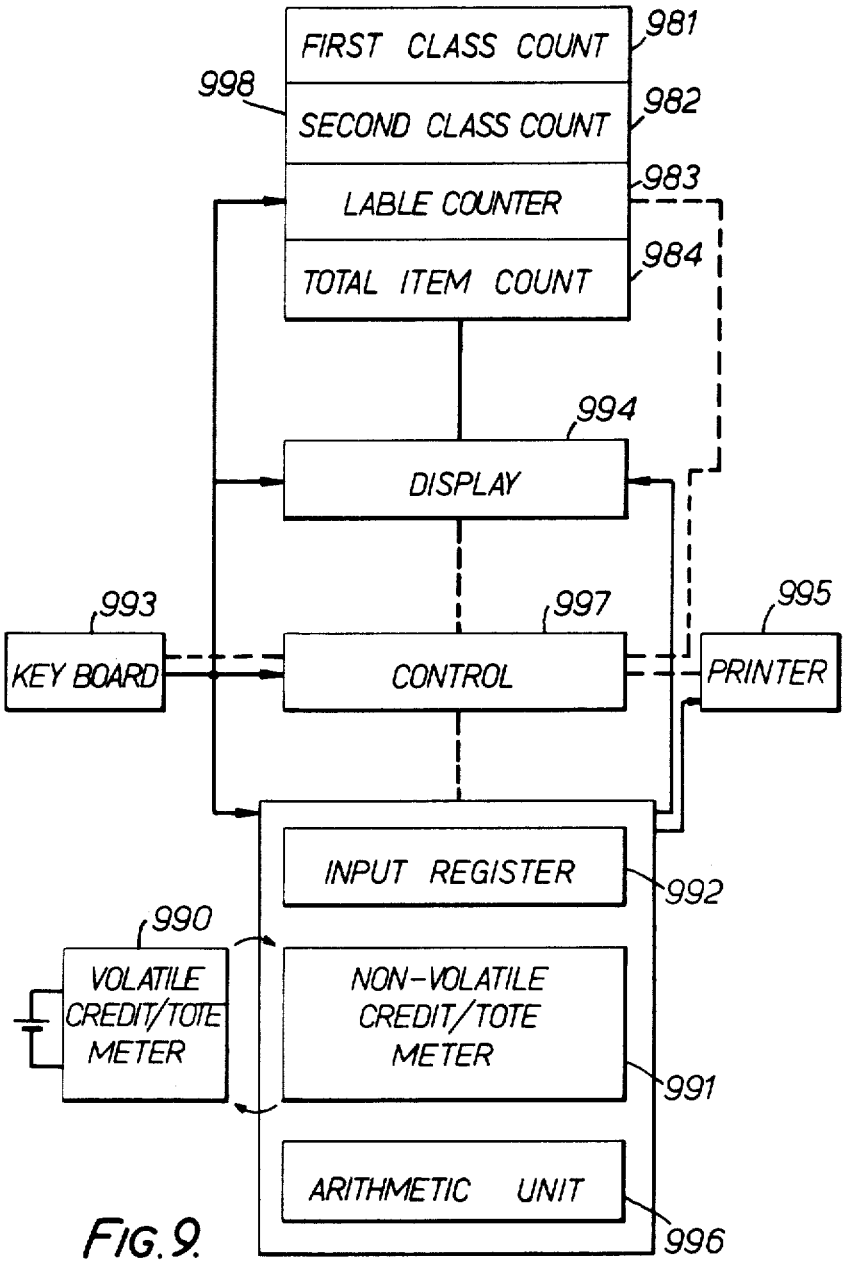

The algorithm of FIGS. 8A, 8B and 8C will now be described in detail.

In the algorithm of FIGS. 8 (and in that of FIGS. 7) solid-lined symbols indicate operational processes or decisions carried out or made automatically, whilst broken-lined symbols indicate manually actuated or effected processes or decisions.

It will be recalled that the algorithm of FIG. 8 applies to an embodiment of the present invention in which non-volatile working register are used (and hence no backing register is employed), which embodiment has, in addition to input and total registers, a credit register and also facilities for counting different classes of mail.

In the algorithm rectangular blocks indicate operational processes carried out, whilst diamond-shaped blocks indicate decision making.

Assuming that the machine has been started and that power supply thereto is on (blocks 81 and 82), the display of the machine is actuated as indicated at block 83. The display would normally indicate IR, that is, the current content of the input register fed in as a value to be franked, which at this stage of operation is zero since no value has yet been input. However, by appropriate operation of keys on the keyboard of the machine any of the following items may be displayed; FCC, the current count of first class items of mail; SCC, the current count of second class items of mail; LC, the current count of labels; TC, the total count of items of mail; CR, the content of the credit register, and TR, the content of the total register.

Next, as indicated at 84, a value to be franked is selected manually on the keyboard and is entered into the input register, and displayed. Then, at step 85 a decision is made as to whether or not a Post Office security switch of the machine is on. Assuming for the time being that this switch is on, in the next step a decision is made, block 86, as to whether or not a first class postage value (8½p say) has been selected as a franking value. If this is found to be the case the first class mail counter of the machine is enabled for operation (block 87). It is found that a first class postage value has not been selected a decision is then made as to whether or not a second class postage value (6½p say) has been selected as a franking value (block 88). If a second class value has been selected the second class mail counter of the machine is enabled for operation (block 89). After enabling of either the first or second class mail counters, or if it is found that neither a first nor a second class value has been selected, it is determined whether franking of a label has been selected (as opposed to franking of an envelope directly), for example by manual actuation of a label selecting switch on the keyboard, at block 90. If label franking is selected a label counter of the machine is enabled for operation (block 91). Subsequently, either after label counter enabling or after block 91 has been bypassed (label franking not selected) it is determined whether or not a high value has been selected for franking (block 92). If it is found that a high value has been selected the display of the selected franking value is caused to operate intermittently (block 93), thereby to attract the machine users attention, and a high value key of the machine is then, to enable further machine operation, set, as indicated at block 94.

Thereafter, or, if it is found that high value is not selected, directly after such non-selection is indicated, a franking key of the machine can be manually (or possibly automatically) actuated (block 95). The franking key is then disenabled, so that inadvertent repeat franking cannot take place (block 96).

It is then determined whether or not the credit register holds a value which is at least equal to the value held in the input register (block 97). If this is not the case a fault code letter "L" is displayed on the display of the machine (block 98). If the credit register is found to hold a sufficiently large value at step 97 the printer of the machine is operated in order to set it in accordance with the content of the input register (block 99). It is then checked that the printer is correctly set by means printing device monitoring means; if this if found not to be the case then until a period of five seconds has elapsed from the start of operation of the printer the printer continues to be driven and further checks made. If, at the end of the said 5 seconds it is found that the printer is still not set to the required value (blocks 180 and 181) the printer device is disenabled and a fault code letter "P" is displayed as indicated at steps 182 and 183.

Assuming, however, that a step 180 it is found that the printer is correctly set then the content of the input register is added to the content of the total register and subtracted from the content of the credit register (blocks 184 and 185).

It is then determined whether the content of the total register has exceeded a predetermined value. If this is found to be the case a fault code letter H is displayed and the content of the input register is deducted from the content of the total register and added to the content of the credit register (blocks 187 and 188). Thereafter operations may, for example, be recommenced for example using a lower franking value such as will not cause overflow of the total register.

Assuming, however, that overflow of the total register is not caused, it is then determined which, if either, of the first and second class mail counters has been enabled and that counter which has been enabled, if either, has its content counted up by one (blocks 189 to 192). It is then determined whether or not the label counter has been enabled, at step 193. If the label counter is found to have been enabled it has its content counted up by one (block 194). Thereafter, whether or not such counting up of the label counter takes place the total counter has its content counted up by one in step 195, whereafter printing or franking is effected on the item to be franked, which is thereafter ejected (blocks 196 and 197).

Franking of one item now being complete it is again determined whether or not a high franking value was selected (block 198). If it is found that a high value was selected the high value key is reset for further use as shown at step 199. Therefter the franking key is re-enabled so that further franking operations may be carried out (block 280). The user then decides whether or not it is required to frank further items at the previously set franking value (i.e. whether or not a multiple run at that franking value is required), as shown at step 281. if a multiple run is required then as indicated by B a further franking operation is undertaken from step 92 of the algorithm.

If a multiple run is not required then the user indicates whether or not further franking at a new franking value is currently required (block 282). If no further franking is required currently machine operations are stopped by the user actuating an "off" key for example (block 283). If a further franking operation is required, the input register is cleared and FCC or SCC and/or LC are disabled (block 284) whereafter operation may be recommenced from step 83 of the algorithm as indicated by C.

Now, returning to step 85 of the alogithm, if it is found that the Post Office security switch is off the following operations are effected.

When the Post Office security switch is off normal operations of the machine are suspended and the machine is in a condition for modification or value adjustment of values stored in its credit and total registers, by authorised Post Office personnel for example.

To this end the authorised Post Office employee must key in, via the keyboard, a secret code by which the machine recognises that person's authorisation by means of value adjustment enabling means provided in the machine, as indicated at step 285. It may also be necessary as mentioned hereinbefore to break a seal and open a combination lock prior to such entry of the secret code.

The secret code entered, it is determined whether or not it is in fact correct (block 286). If the code is found to be incorrect modification of credit and tote registers is disenabled.

Assuming, however, that the entered code is correct modification is then enabled (block 288) by the value adjustment enabling means. Thereafter, for example by operation of keys on the keyboard, modification values for the credit and/or tote registers are fed in and these values accordingly employed for such modification (step 289). If further modification is required then this can also be effected (step 290).

After completion of modification the user switches on the Post Office security switch (block 291) and thereafter the secret code is reset (step 292) whereafter if further modification is required the secret code must be keyed in once more. Now, if franking operations are then required, machine operation can be re-commenced from step 83 of the algorithm but if no franking is currently required the machine can be switched to an off state.

Figure 2:
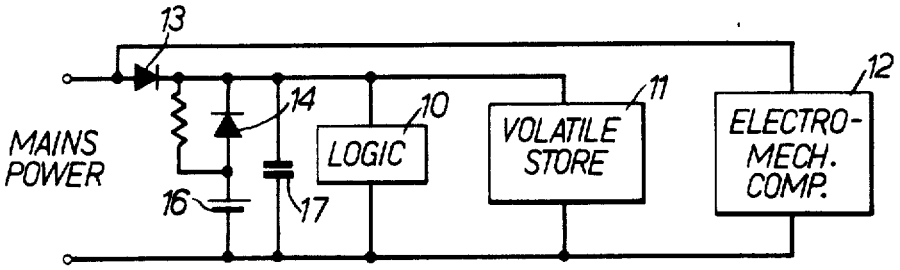
Figure 3:
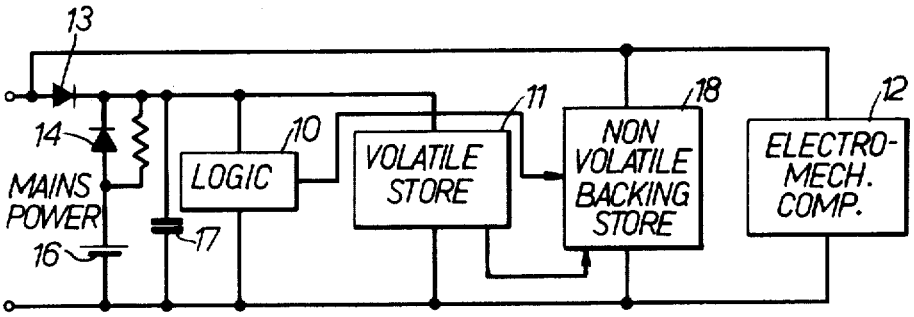
Figure 4:
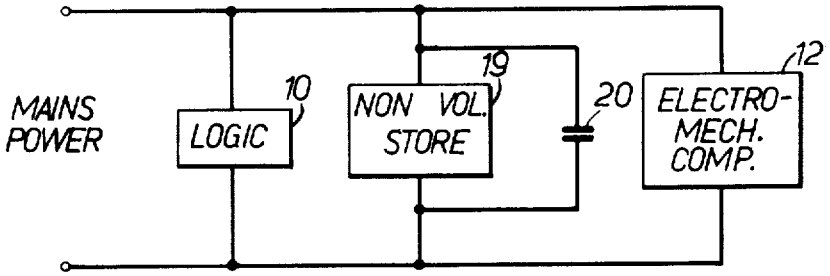
Figure 5:
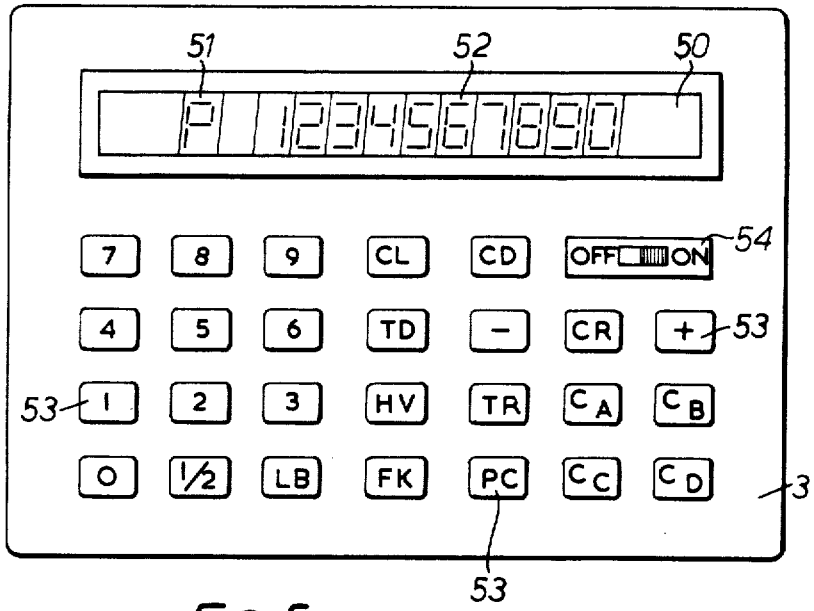
Figure 10:
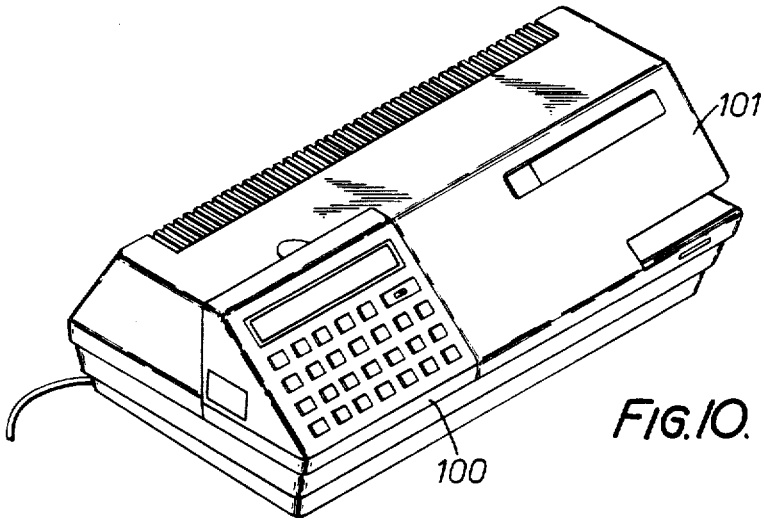
Figure 6A:
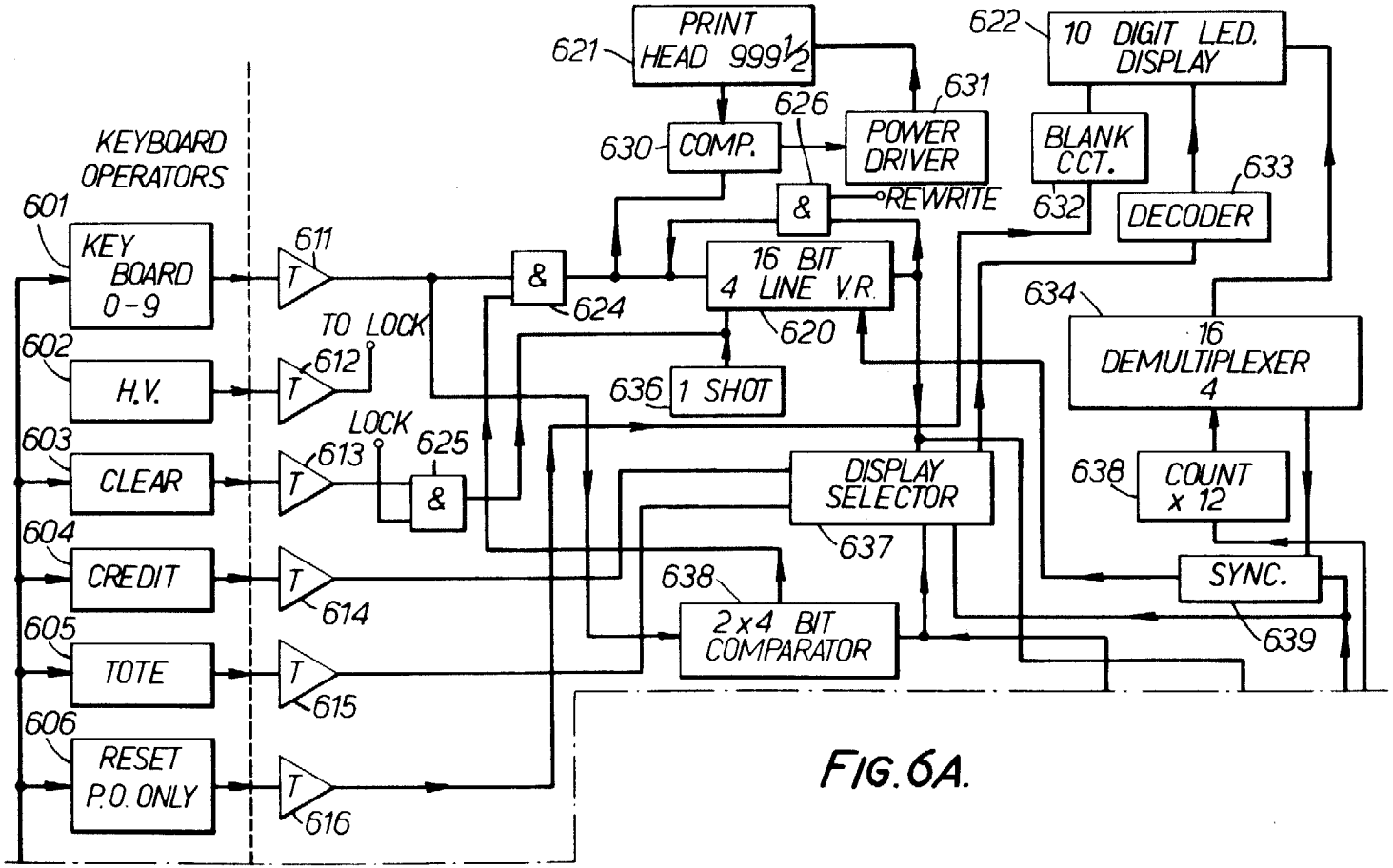
Figure 6B:
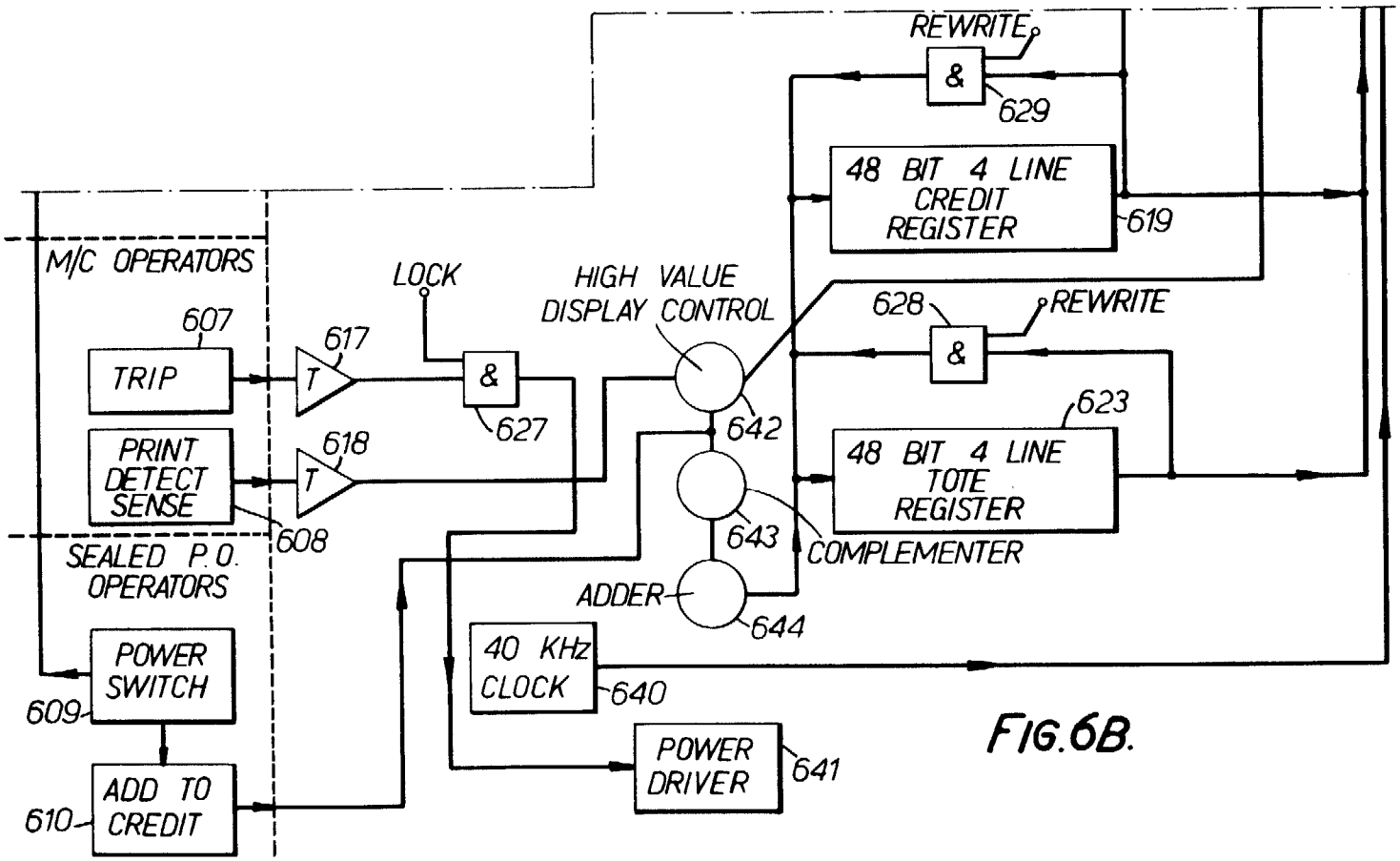

It will be seen that the algorithm of FIGS. 7 is in may ways similar to that of FIGS. 8. However, the embodiment of the present invention to which the algorithm of FIGS. 7 refers has features as shown in FIG. 3, for example. That is to say, whereas the machine referred to in FIGS. 8 has non-volatile working registers (or effectively non-volatile working registers) the machine of FIGS. 7 has volatile working registers and non-volatile backing store. The machine also has, as hereinbefore described, a battery for ensuring correct transfer of information to the backing registers in the even of mains failure, or for powering the detacheable electronics unit of the machine (c.f. FIG. 10) when it is, for example, removed from the printer unit of modification machine for delivery to the Post Office for modiciation of credit and tote values therein.

It will be seen also that the algorithm of FIG. 7 explicitly takes into account the detachability of the electronics unit, whereas the algorithm of FIGS. 8 does not. However, it should be appreciated that a machine embodying the present invention and operating on the basis of the algorithm of FIGS. 8 does in fact have mutually separable electronics and printing units as hereinbefore described.

The machine described with reference to FIGS. 7 has facilities for providing counts of first and second class mail and of label franking and a total mail count, as does the machine of FIGS. 8.

The main differences between the algorithms of FIGS. 7 and 8 can be described as follows.

In FIG. 7B it will be seen that after is is determined whether the content of the credit register is at least equal to the content of the input register (or value register), corresponding to step 97 of FIGS. 8, and prior to driving of the printer (set printer, step 99 in FIGS. 8) the content of the input register IR is added to the content of the tote register and then it is determined whether or not the result will cause an overflow in the tote register (as in FIG. 8, step 186).

However, it is also determined whether of not the result is greater than or equal to a pre-programmed number N. If either overflow is found or the result is at least equal to N, fault code letter H is displayed and the machine locks off.

Thus, whereas in the machine of FIGS. 8 the maximum permitted value for the content of the tote register is simply the maximum possible value it can hold, in the machine of FIGS. 7 a lower maximum permitted value (N) can be set.

Following these steps, in FIG. 7, operation similar to that of FIG. 8 is resumed (except of course steps 186 to 188 of FIG. 8 have already been effected).

It will be seen also in FIG. 7 that if it is found, at a step corresponding to step 282 of FIG. 8, that no further franking is currently required, idle-state monitoring means in the machine operate to bring about transfer of the contents of CR and TR automatically to the non-volatile backing store upon elapsed of a predetermined period of time since completion of the last preceding franking operation.

It will also be noted that in the algorithm of FIG. 7 (c.f. FIG. 7A) if it is determined, in a step corresponding to step 82 of FIG. 8, that mains is off it is subsequently determined whether or not the detacheable electronics unit is detached from the printer unit. If the electronics unit is found to be detached it is then determined whether or not the battery voltage is sufficiently high. If not, an error code letter E is displayed intermittently, but if the voltage is found to be sufficiently high the display, for the content of the input register for example, is actuated.

Operations in relation to the Post Office security switch are also somewhat different in the algorithm of FIGS. 7, in that the normal operation step 85 of FIGS. 8 does not occur. A step equivalent to 85 of FIGS. 8 occurs in FIGS. 7 only if the electronics unit is found to be detached (for example for taking to the post office for modification of credit and tote values) and the battery voltage is found to be sufficiently high. It will be seen that succeeding steps in FIGS, 7 are similar to steps 285 to 292 of FIGS. 8, but before normal franking can be resumed the detacheable head must be replaced of course.

Further, different, operational algorithms are also possible of course in different embodiments of the present invention.

We claim:

1. In an electronic franking machine comprising:

franking value selection means, operable selectively to provide an electrical input representative of a franking value selected for a desired next franking operation of the machine, for setting the selected franking value into the machine;

a digital electronic input register, having an input connected to said franking value selection means, for receiving and holding said selected franking value;

an electrically adjustable printing device, settable electrically to any selected one of a plurality of different conditions enabling the device to be actuated respectively to print a plurality of different franking values;

setting control circuitry, connected with said input register and said printing device, operable in dependence upon said electrical input to bring about setting of said printing device to the condition in which it is actuable to print said selected franking value;

a digital electronic total register, for holding an accumulated value representative of the sum of the respective franking values used in preceding franking operations of the machine; and totalling circuitry, connected between said input register and said total register, for effecting addition of said selected franking value held in the input register to said accumulated value; whereby a new accumulated value is provided, to be held in said total register, after printing of said selected franking value, in place of said accumulated value previously held there, the improvement wherein said machine comprises an electronics unit which houses franking value selection means, said input register, said total register and said totalling circuitry and a separate printing unit which houses the said electrically adjustable printing device and with which said electronics unit is engaged during the operation of the machine, [said electronics and printing units being readily separable one from the other and having complementary coupling means for setting up operative electrical connections therebetween when the electronics unit is engaged with the printing unit.] *said electronics and printing units nesting together with the electronics unit being carried by the printing unit and with the electronics unit fitting into a spatial envelope defined by the exterior dimensions of the printing unit, the electronics unit being readily separable from the printing unit and the electronics and printing units being connected together by means of a plug projecting from one said unit which directly engages a socket in the other said unit to set up operative electrical connections therebetween when the electronics unit is engaged with the printing unit, said plug and socket connectors being concealed when said electronics and printing units are nested together.*

2. A machine as claimed in claim 1, wherein said total register is a non-volatile store.

3. A machine as claimed in claim 2 having an electrical mains input for receiving operating power for the machine from an external mains supply, further comprising capacitive storage means connected to store electrical energy and to deliver that stored energy in the event of failure of said external mains supply in the course of such an addition, whereby the addition can be completed after such failure.

4. A machine as claimed in claim 2, wherein said total register comprises an MNOS storage array.

5. A machine as claimed in claim 1, having an electrical mains input for receiving operating power for the machine from an external mains supply, wherein said total register is a volatile store, the machine further comprising auxiliary supply means including a battery, operable to provide an electrical supply for said total register from said battery in the event of failure of said external mains supply, for energizing the total register to retain the said accumulated value after such failure.

6. A machine as claimed in claim 1, having an electrical mains input for receiving operating power for the machine from an external mains supply, wherein the said total register is a volatile store, the machine further comprising back-up storage means operatively connected to said total register to receive said accumulated value in the event of failure of said external mains supply and to retain said accumulated value therein after such failure.

7. A machine as claimed in claim 6, wherein said back-up storage means comprise a volatile back-up store and battery supply means connected to supply operating power to said volatile back-up store in the event of such failure.

8. A machine as claimed in claim 6, further comprising idle-state monitoring means connected to bring about transfer of said accumulated value stored in said total register to said back-up storage means upon elapse of a predetermined period of time since completion of the last preceding franking operation.

9. A machine as claimed in claim 6, wherein said back-up storage means comprise a non-volatile back-up store in which the acumulated value received is retained.

10. A machine as claimed in claim 9, further comprising auxiliary battery supply means connected to supply operating current to parts of the machine that effect transfer of said accumulated value to said non-volatile back-up store in the event of such failure.

11. A machine as claimed in claim 9, wherein said non-volatile back-up store comprises an MNOS storage array.

12. A machine as claimed in claim 1, further comprising:

a digital electronic credit register, housed in the said electronics unit, for holding a current credit value produced by subtraction of the respective franking values used in preceding franking operations of the machine from a maximum credit value preset in said credit register; and subtraction circuitry, housed in the said electronics unit and connected between said input register and said credit register, for effecting subtraction of said selected franking value held in said input register from said current credit value, whereby a new current credit value is provided to be held in said credit register, after said printing, in place of said current credit value previously held there.

13. A machine as claimed in claim 12, having an electrical mains input for receiving operating power for the machine from an external mains supply, wherein said credit and total registers are volatile stores, the machine further comprises auxiliary supply means including a battery, operable to provide an electrical supply for said credit and total registers and said totalling circuitry and subtraction circuitry in the event of failure of said external mains supply, for [energising] *energizing* said credit register to retain said current credit value, and said total register to retain said accumulated value, after such failure.

14. A machine as claimed in claim 12, having an electrical mains input for receiving operating power for the machine from an external mains supply, wherein said credit and total registers are volatile stores, the machine further comprising back-up storage means operatively connected to said credit and total registers to receive said current credit value from the credit register and said accumulated value from said total register, and to retain those values, in the event of failure of said external mains supply to the machine.

15. A machine as claimed in claim 12, wherein said back-up storage means comprise a non-volatile back-up store connected to receive said current credit value and said accumulated value in the event of such failure of external mains supply.

16. A machine, as claimed in claim 15, further comprising auxiliary battery supply means connected to supply current to parts of the machine that effect transfer of said current credit value from said credit register, and said accumulated value from said total register, to said non-volatile back-up store in the event of such failure.

17. A machine as claimed in claim 15, wherein the said credit and total registers are non-volatile stores.

18. A machine as claimed in claim 17, further comprising capacitive storage means connected to store electrical energy and to deliver that stored energy in the event of failure of said external mains supply in the course of such addition and such subtraction, whereby the addition and the subtraction can be completed after the failure.

19. A machine as claimed in claim 17, wherein said credit register comprises an MNOS storage array and said total register comprises an MNOS storage array.

20. A machine as claimed in claim 12, wherein the said totalling means *and* the said subtraction means comprise a CMOS IC (complementary-metal-oxide-semiconductor integrated circuit).

21. A machine as claimed in claim 12, further comprising printing-device monitoring means connected to monitor response of the printing device to operation of said setting control means and operable to de-actuate the printing device if correct setting thereof to said selected franking value is not completed by the end of a preselected period of time of operation of said setting control means.

22. A machine as claimed in claim 12, further comprising, housed in the said electronics unit, an auxiliary register and associated circuitry components operable to accumulate and store in the auxiliary register a count of the number of franking operations that have been carried out by the franking machine using a particular preselected franking value.

23. A machine as claimed in claim 12, wherein the said franking value selection means comprise a keyboard operable for selecting such a franking value, and further comprise display means operable to display a franking value selected.

24. A machine as claimed in claim 23, wherein the said keyboard includes keys and respective associated circuitry components which are selectively actuable to cause the value stored in any selected one of the registers to be displayed by the said display means.

25. A machine as claimed in claim 23, further comprising, housed in the said electronics unit, value adjustment enabling means operable to enable the value stored in at least one of the registers to be changed selectively while the machine is not being used to carry out franking operations.

26. A machine as claimed in claim 25, wherein such operation of the value adjustment enabling means permits the value stored in at least one of the registers to be so changed by operation of keys on the said key-board.

27. A machine as claimed in claim 25, wherein a locking device, having locked and unlocked conditions, is provided, in the said electronics unit, which must be placed in said unlocked condition before the value adjustment enabling means can be so operated, thereby to restrict access to the said value adjustment enabling means.

28. A machine as claimed in claim 27, wherein the said locking device can be changed from said locked condition into said unlocked condition by use of the said key-board to key in a predetermined code sequence.

* * * * *